(12) United States Patent
Chen et al.

(10) Patent No.: US 7,882,701 B2
(45) Date of Patent: Feb. 8, 2011

(54) MICROFABRICATED MECHANICAL FREQUENCY MULTIPLIER

(75) Inventors: Shih-Chi Chen, Boston, MA (US); Martin L. Culpepper, Marblehead, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 700 days.

(21) Appl. No.: 11/849,956

(22) Filed: Sep. 4, 2007

(65) Prior Publication Data
US 2008/0024038 A1    Jan. 31, 2008

Related U.S. Application Data

(63) Continuation-in-part of application No. 11/037,866, filed on Jan. 18, 2005, now Pat. No. 7,451,596.

(51) Int. Cl.
*F01B 29/10* (2006.01)
*H02N 10/00* (2006.01)

(52) U.S. Cl. .......................... 60/528; 60/529; 310/306; 310/309

(58) Field of Classification Search ........... 60/527–529; 310/306–309, 310, 317, 328; 359/290–291
See application file for complete search history.

(56) References Cited

U.S. PATENT DOCUMENTS

| | | | |
|---|---|---|---|
| 5,436,648 A | | 7/1995 | Stortz et al. |
| 6,002,184 A | | 12/1999 | Delson et al. |
| 6,307,285 B1 | | 10/2001 | Delson et al. |
| 6,545,385 B2 * | | 4/2003 | Miller et al. ............... 310/309 |
| 6,759,787 B2 * | | 7/2004 | Miller et al. ............... 310/309 |
| 6,960,849 B1 * | | 11/2005 | Klody et al. ........... 310/40 MM |
| 7,451,596 B2 * | | 11/2008 | Culpepper et al. ............ 60/527 |
| 2001/0048265 A1 * | | 12/2001 | Miller et al. ............... 310/309 |
| 2004/0189141 A1 | | 9/2004 | Tavkhelidze et al. |
| 2006/0156722 A1 | | 7/2006 | Culpepper et al. |
| 2007/0120438 A1 | | 5/2007 | Divoux |
| 2007/0159679 A1 | | 7/2007 | Hagood et al. |

OTHER PUBLICATIONS

Mankame, Nilesh D. and G.K. Ananthasuresh, 2004, "Topology Optimization for Synthesis of Contact-Aided Compliant Mechanisms Using Regularized Contact Modeling", Computers and Structures, 2004, vol. 82, pp. 1267-1290.

(Continued)

*Primary Examiner*—Hoang M Nguyen
(74) *Attorney, Agent, or Firm*—Sampson & Associates, P.C.

(57) ABSTRACT

A high-bandwidth MEMS actuation system includes actuator pairs coupled in parallel to a stage, each actuator energizable in a drive direction against a bias to an energized position, and movable upon deenergization, to the rest position to define an actuation cycle. The actuators are asymmetric, with an energization frequency greater than a bias frequency, and are opposably coupled to one another. A pulse generator alternately transmits pulses to the actuators, at an alternation frequency greater than the bias frequency. The pulse generator transmits the energization pulses to each of the actuator pairs sequentially at a sequence frequency greater than the cycle frequency. The actuators are each movable from energized to rest positions faster than the bias frequency, and the actuator pairs are sequentially energizable faster than the cycle frequency, wherein the stage is movable in one degree of freedom at a bandwidth of at least four times the cycle frequency.

29 Claims, 11 Drawing Sheets

OTHER PUBLICATIONS

Ditman Jason B., Lawrence A. Bergman and Tsu-Chin Tsao, The Design of Extended Bandwidth Shape Memory Alloy Actuators, AIAA-94-1757-CP 1994, pp. 210-220.

Park, Jac-Sung, Larry L. Chu, Andrew D. Oliver and Yogesh B. Gianchandani, "Bent-Beam Electrothermal Actuators-Part II: Linear and Rotary Microengines", Journal of Microelectromech.anical Systems, Jun. 2001, vol. 10, pp. 255-262.

Pons, Jose L., "Emerging Actuator Technologies: A Micromechatronic Approach", Wiley, NY, May 2005, pp. 20-23.

* cited by examiner

FIG. 8B
DISPLACEMENT ALONG Y-AXIS

FIG. 8A
ROTATION AROUND Z-AXIS

MICROFABRICATED MECHANICAL FREQUENCY MULTIPLIER

RELATED APPLICATION

This application is a Continuation In Part of co-pending U.S. patent application Ser. No. 11/037,866 entitled Multiple Degree of Freedom Micro Electro-Mechanical System Positioner and Actuator, filed on Jan. 18, 2005, now U.S. Pat. No. 7,451,596 the contents of which are incorporated herein by reference in their entirety for all purposes.

GOVERNMENT SPONSORSHIP

This invention was made with government support under Contract Number DMI-0348242, awarded by the National Science Foundation, and Contract Number 1-R21-CA118400-01, awarded by the National Cancer Institute/U.S. National Institutes of Health. The government has certain rights in the invention.

BACKGROUND

1. Technical Field

The present invention relates generally to a MEMS device, and more particularly, to a micro-scale positioning device capable of rapidly scanning a stage portion relative to a ground or target with a relatively high degree of accuracy and precision.

2. Background Information

Throughout this application, various publications, patents and published patent applications are referred to by an identifying citation. The disclosures of the publications, patents and published patent applications referenced in this application are hereby incorporated by reference into the present disclosure.

There is a growing need for high-bandwidth (high speed), fine motion control and positioning at micro- and nano-scales, such as for a growing number of MEMS applications, including optical switching, active alignment of fiber optic elements, micro-scale machining, micro-resonators, manipulation for bio molecules, and micro-scanners for endoscopy and other medical scanning procedures.

Culpepper, in U.S. patent application Ser. No. 10/175,415, filed on Jun. 19, 2002, entitled "Six Degree of Freedom Flexure Stage", (the '415 reference'), discloses an adjustable monolithic compliant mechanism. This compliant mechanism includes a stage which may be adjusted by displacing one or more tabs coupled thereto, to provide for controlled movement in six degrees of freedom.

Next generation applications (e.g., high speed fiber optic alignment, optical switching, and the like) will require precision alignment devices capable of being fabricated on a micro- or nano-scale, e.g., as MEMS devices fabricated on a chip-level using many conventional semiconductor fabrication techniques, and which are capable of providing high speed operation, with high resolution (i.e., nanometer/micro-radian) position control with up to six degrees of freedom (i.e., x, y, z, $\theta x$, $\theta y$, and $\theta z$).

However, many applications, even those that may not require movement in a full six degrees of freedom, require higher speed operation than that provided by conventional micro-actuators. For example, thermal actuators may be heated (and thus actuated in one direction) relatively quickly, but then return to their rest position relatively slowly (i.e., as a function of heat dissipation). This characteristic thus represents a limit to their speed of operation (bandwidth) and consequently, to the range of applications in which these actuators may be employed. This limitation similarly applies to nominally any other actuators (such as electro-mechanical and magnetostrictive actuators) that are moved upon an application of energy, and then rely on dissipation of that energy to return to a rest or neutral position.

Therefore there exists a need for a micro- and/or nano-fabricated, positioning device capable of high bandwidth operation.

SUMMARY

In one aspect of the present invention, a high-bandwidth micro electro-mechanical system (MEMS) actuation system includes at least two actuator pairs coupled in parallel to a stage, the actuator pairs each including first and second controlled input bi-directional semiconductor actuators. The actuators are each energizable to move in a drive direction against a bias from a rest position to an energized position, with the bias moving them to their rest positions upon deenergization. This movement from the rest position to the energized position and back to the rest position defines an actuation cycle. The actuators are also asymmetric, so that a maximum energization frequency of movement from the rest to the energized positions is greater than a maximum bias frequency of movement from the energized to the rest positions. The first and second actuators are opposably coupled to one another, so that drive directions of the actuators oppose one another.

A pulse generator is configured to alternately transmit energization pulses to the actuators of each actuator pair, at an alternation frequency greater than the bias frequency of movement. The pulse generator is also configured to transmit the energization pulses to each of the actuator pairs sequentially at a sequence frequency greater than a frequency of the actuation cycle. The actuators are thus each movable from their energized positions to their rest positions at a frequency greater than the bias frequency of movement, the actuator pairs are sequentially energizable at a sequence frequency greater than the cycle frequency, so that the stage is movable in a single degree of freedom at a bandwidth of at least four times the cycle frequency.

Another aspect of the invention includes a method for actuation, which includes coupling at least two actuator pairs in parallel to a stage, the actuator pairs including at least first and second bi-directional micro- or nano-scale sized actuators. The actuators are each energizable to move in a drive direction against a bias from a rest position to an energized position, and movable by the bias to the rest position upon deenergization, to define an actuation cycle. The actuators are asymmetric, wherein a maximum energization frequency of movement from the rest to the energized positions is greater than a maximum bias frequency of movement from the energized to the rest positions. The method includes opposably coupling the first and second actuators to one another, so that the drive directions of the actuators oppose one another, and coupling a pulse generator to the actuators of each actuator pair. The pulse generator is used to alternately transmit energization pulses to the actuators of each actuator pair at an alternation frequency greater than the bias frequency of movement. The pulse generator is also used to transmit the energization pulses to each of the actuator pairs sequentially at a sequence frequency greater than the frequency of the actuation cycle. The actuators are thus each movable from their energized positions to their rest positions at a frequency greater than the bias frequency of movement, the actuator pairs are sequentially energizable at a sequence frequency greater than the cycle frequency, and the stage is movable in a single degree of freedom at a bandwidth of at least four times the cycle frequency.

Still another aspect of the invention includes a high-bandwidth micro electro-mechanical system (MEMS) actuation system. This system includes at least two actuator pairs coupled in parallel to a stage means, the actuator pairs each including first and second controlled input bi-directional actuation means. The actuation means are each energizable to move in a drive direction against a bias from a rest position to an energized position, and are each movable by the bias to the rest position upon deenergization, to define an actuation cycle. The actuation means are asymmetric, so that a maximum energization frequency of movement from the rest to the energized positions is greater than a maximum bias frequency of movement from the energized to the rest positions. The first and second actuation means are opposably coupled to one another, so that drive directions of the actuators oppose one another. A pulse generation means is coupled to the actuators of each actuator pair, and configured to alternately transmit energization pulses to the actuation means of each actuator pair at an alternation frequency greater than the bias frequency of movement. The pulse generation means is also configured to transmit the energization pulses to each of the actuator pairs sequentially at a sequence frequency greater than a frequency of the actuation cycle. The actuation means are thus each movable from their energized positions to their rest positions at a frequency greater than the bias frequency of movement, the actuator pairs are sequentially energizable at a sequence frequency greater than the cycle frequency, and the stage means is movable in a single degree of freedom at a bandwidth of at least four times the cycle frequency.

BRIEF DESCRIPTION OF THE DRAWINGS

The above and other features and advantages of this invention will be more readily apparent from a reading of the following detailed description of various aspects of the invention taken in conjunction with the accompanying drawings, in which.

DETAILED DESCRIPTION

In the following detailed description, reference is made to the accompanying drawings that form a part hereof, and in which is shown by way of illustration, specific embodiments in which the invention may be practiced. These embodiments are described in sufficient detail to enable those skilled in the art to practice the invention, and it is to be understood that other embodiments may be utilized. It is also to be understood that structural, procedural and system changes may be made without departing from the spirit and scope of the present invention. The following detailed description is, therefore, not to be taken in a limiting sense, and the scope of the present invention is defined by the appended claims and their equivalents. For clarity of exposition, like features shown in the accompanying drawings are indicated with like reference numerals and similar features as shown in alternate embodiments in the drawings are indicated with similar reference numerals.

Referring to the accompanying figures, embodiments of the present invention address the aforementioned drawbacks, to provide a high bandwidth microfabricated actuation system and positioner. These embodiments couple at least two pairs of opposed actuators to one another, e.g., in parallel, the actuators of each pair being communicably coupled to a processor configured to alternately energize them with high frequency pulses. In an exemplary embodiment, two opposed thermal actuators may be used, in which the first actuator is pulsed, moving it to an actuated (energized) position. The second actuator may then be pulsed to effectively pull the first actuator back to its starting position, e.g., without having to wait for the first actuator to completely dissipate its heat. The second actuator thus serves to actively return the first actuator towards its rest or neutral position more quickly than simply relying on passive heat dissipation. The second pair may then be actuated in a similar manner without waiting for the first pair to completely dissipate its heat. This approach may provide orders of magnitude increases in bandwidth relative to conventional passive approaches. For example, conventional microfabricated thermal actuators of 2-3 mm in length having an operational bandwidth of 10 Hz may be configured in accordance with the teachings of the present invention to provide an operational bandwidth of up to 1 kHz or more.

Embodiments of this invention may be used in nominally any application in which relatively high frequency actuation is desired, such as in applications relating to nanomanufacturing/assembling, fiber-optic/micro-optics, data storage, probing equipment for nano-scale measurements, scanning microscopes, high-speed micro-machining centers, high-speed active fiber aligners/resonators, and biomedical/biological science applications such as endoscopic scanners and the like. For instance, embodiments using thermal actuators may be incorporated into an endoscope used to perform high speed, arthroscopic tissue scans. These embodiments provide the high bandwidth desired for high resolution scanning, and the like. The use of thermal actuators reduces chances, relative to many prior art actuators, of inadvertently exposing tissue to high voltages.

Where used in this disclosure, the term "controller" is intended to encompass a workstation, personal computer, personal digital assistant (PDA), wireless telephone, processor, or any other suitable computing device with or without a user interface. The term "microfabrication" or "microfabricated" refers to various generally planar fabrication techniques for manufacturing micro-scale components/devices, including lithographic fabrication processes, typically used for, or adapted from, semiconductor or MEMS fabrication and general non-lithographic fabrication processes such as micro-molding, micro-stamping, etc. The term "nanomanufacturing" or "nanofabrication" refers to the precision assembly, creation and handling of components that generally require assembly accuracies of tens to hundreds of Angstroms (Å). The term "nano-scale" refers to sizes (and/or positional accuracies) within a range of about one to hundreds of nanometers, while "micro-scale" refers to sizes (and/or positional accuracies) within a range of about one to hundreds of microns. It should be recognized that components, such as the actuators described hereinbelow, in any one or more of these size ranges may be used in the various embodiments of the present invention.

Figure 1A:
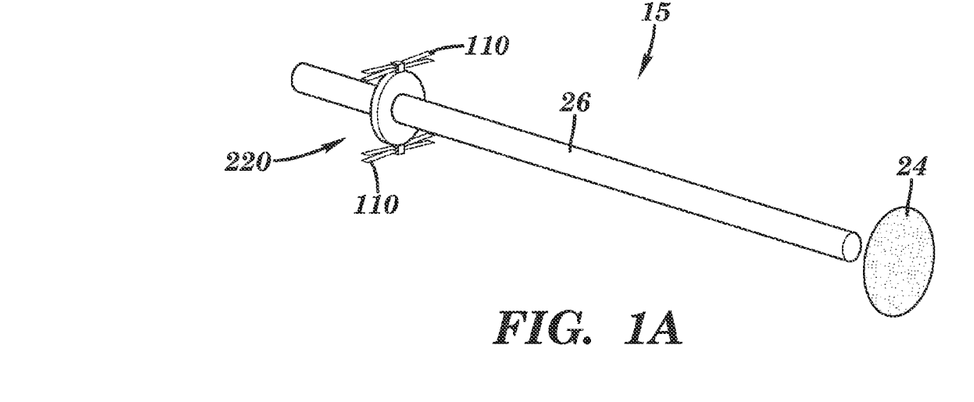
FIG. 1A is a perspective schematic view of a representative application, with portions removed for clarity, of embodiments of the present invention.
Figure 1B:
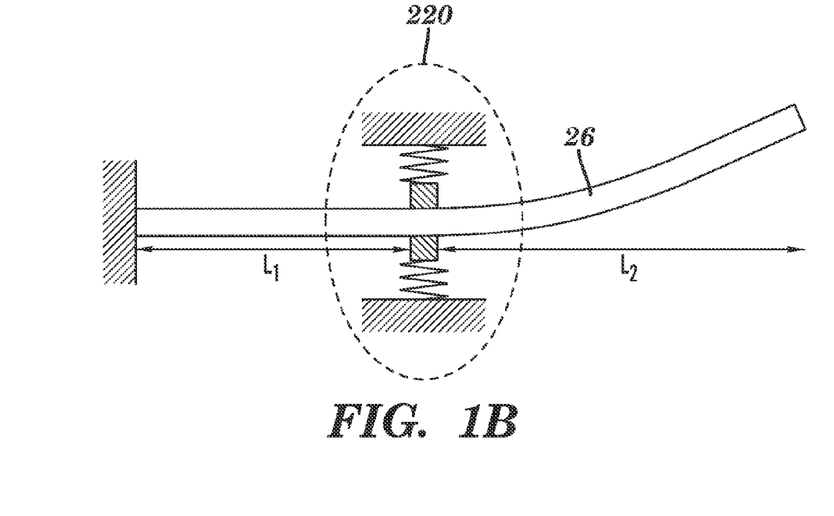
FIG. 1B is schematic, elevational side view of the application of FIG. 1A.

Referring now to the figures, embodiments of the present invention will be more thoroughly described. As shown in FIG. 1A, in a representative application, a positioner 220, which incorporates at least two actuator pairs 110 to form a mechanical frequency multiplier (MFM, or actuation system) of the present invention, may be incorporated within a high speed fiber resonator 15 to actively resonate or scan the distal (free) end of an optical fiber 26 over a target 24. As shown in FIG. 1B, the relative length of fiber 26 on either side of positioner 220, including length L1 between positioner 220 and ground, and length L2, between positioner 220 and the distal end, may be adjusted to achieve a desired range of motion at the distal end.

Figure 2A:
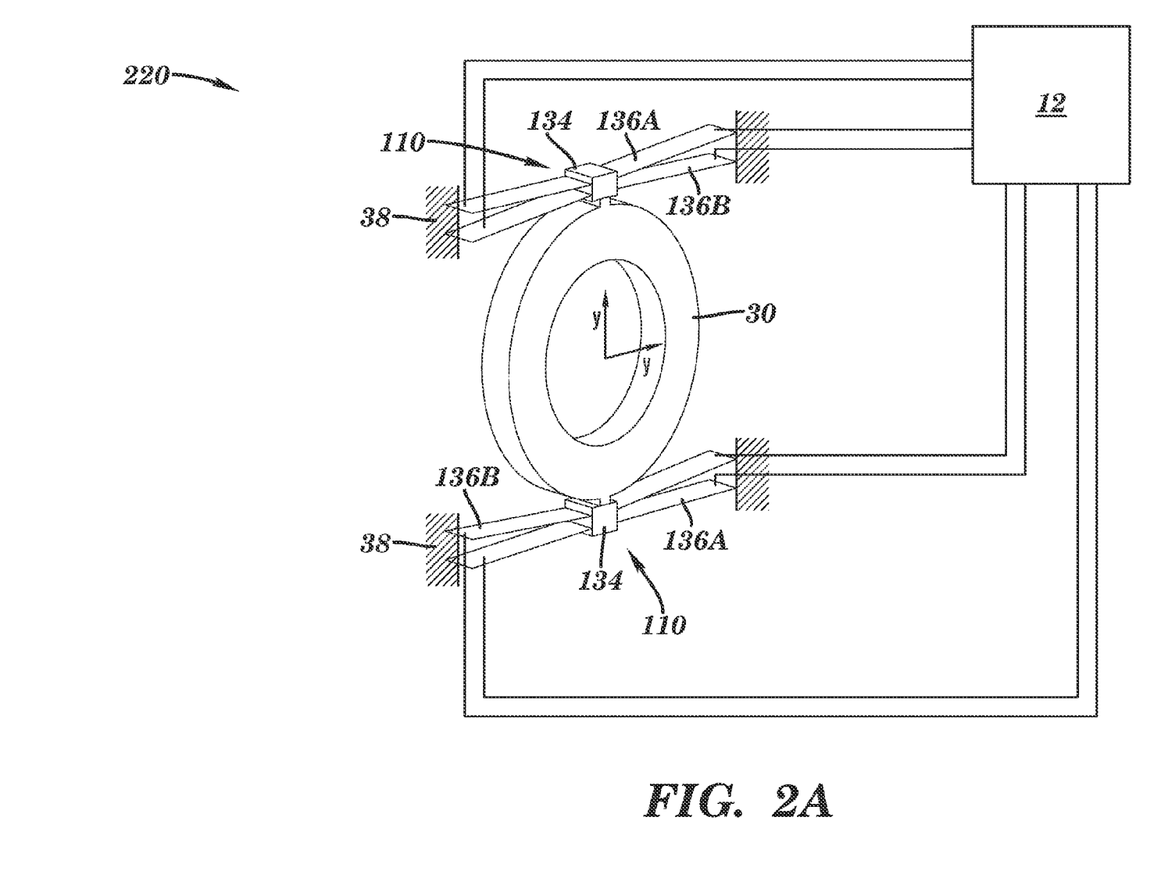
FIG. 2A is a schematic perspective view of an exemplary embodiment of a positioner usable in the application of FIGS. 1A & 1B.

In a particular embodiment, such as shown in FIG. 2A, positioner 220 includes an MFM in the form of two actuator pairs 110 coupled in parallel to one another, to stage 30, to form a planar, monolithic, micro-scale sized device capable of generating controlled, high bandwidth displacements/motions of stage 30. In this embodiment, stage 30 is coupled to actuator pairs 110 by members (flexures) 134. In this particular embodiment, actuator pairs 110 are of a chevron configuration, in which the flexures 134 are coupled to medial portions of each actuator 136 (e.g., 136A and 136B), while the ends of each actuator may be secured to ground 38. In this chevron configuration, actuators 136A, 136B are operationally opposed to one another, so that energization of one actuator generates movement, e.g., in the + or −Y direction as shown, which opposes the energization movement of the other actuator. In this regard, it should be recognized that energization generates a longitudinal expansion of the actuator that serves to move flexure 134 along the y axis. Positioner 220 may be a single layer device, such as to provide in-plane motion along the x-y plane as shown, or may be provided with multiple layers to additionally provide out-of-plane motion as described hereinbelow with respect to positioner 20 of FIG. 7.

As also shown, the actuators 136A, 136B of each pair 110 are communicably coupled to a controller 12 configured for alternately supplying the actuators with a pair of electric energization signals/pulses at relatively high frequency, e.g., to generate a high frequency oscillation along the y axis. The frequency at which these pulses are supplied may be nominally as high as the actuators 136 are capable of operating in a single (e.g., forward/drive) direction, subject to any limitations imposed by the dynamic characteristics of the assembly (e.g., resonance frequencies). In this manner, the actuators are each movable from their energized positions to their rest positions at a frequency greater than the speed at which they passively cool down (e.g., greater than their bias frequencies of movement). Once the first actuator pair has been oscillated in this manner, the controller may similarly energize the second, e.g., parallel, actuator pair in the same manner. As mentioned above, this second oscillation may be effected nominally without waiting for the first actuator pair to cool to provide repeated high speed oscillation. Thus, the actuator pairs are sequentially energizable at a sequence frequency greater than the cycle frequency of an individual actuator, to move the stage in a single degree of freedom at a bandwidth of at least four times the cycle frequency (ten times or more for embodiments using thermal actuators as discussed hereinbelow).

Although in this example, two actuator pairs are shown and described, additional actuator pairs, such as described hereinbelow with respect to FIG. 2B, may be used either in parallel or disposed at predetermined angular intervals to one another, to further increase the operational bandwidth of the system. Embodiments of this invention thus apply time-delayed pulses to any number of opposing actuators that typically have mutually distinct forward and return stroke speeds to generate high speed mechanical short-pulse movement along any desired directional axis. These controlled, time-delayed short pulses are effectively combined by the opposed coupling of the actuators, to enable actuators that are conventionally limited by relatively low frequency response, to provide a relatively high frequency actuation system. Moreover, although positioner 220 is shown and described as generating movement along a single axis, movement in up to six degrees of freedom may be provided, such as in embodiments discussed hereinbelow.

Actuators 36, 136 used in embodiments of this invention may be of substantially any type, including, for example, electro-mechanical, magnetostrictive, thermomechanical, and active carbon nanotube actuators, etc. that are moved upon an application of energy, and then rely on dissipation of that energy to return to a rest or neutral position. Thermomechanical actuators (TMAs) are used in the representative embodiments shown and described herein, as they are good examples of actuators having significantly different forward and return stroke speeds. Moreover, TMAs have many desirable aspects, such as their ability to provide relatively fast forward stroke speeds with relatively low input voltages. Their characteristic slow return stroke speeds, which have heretofore limited their usefulness in many conventional high-speed applications, may be conveniently overcome by the teachings of the present invention.

It has been realized that the bandwidth of a TMA is generally limited by its own heat capacity, i.e., its own heating and cooling ability. A typical TMA can heat up quickly when enough power is supplied in a relatively short period of time. This time scale is related to the microscopic energy transport mechanism, e.g., of the semiconductor material from which it is fabricated, which primarily includes electron collision/scattering and phonon scattering, that are on the scale of $10^{-15}$ and $10^{-13}$ seconds, respectively. As a result, the relaxation/diffusion time constant of these processes determines the fundamental bandwidth limit of a heating/cooling process. This means that the bandwidth of the Joule heating beam of a TMA is limited by its cooling process.

Embodiments of the present invention thus effectively extract the high frequency content of nominally any actuator having both high and low frequency content, such as a TMA. Indeed, for convenience, reference is made herein to TMAs, with the understanding that nominally any type of actuator may be used. Moreover, while representative embodiments hereof are adapted to actuators having both relatively high and low frequency content (e.g., mutually distinct forward and return stroke rates), various embodiments may use actuators without such distinct frequency content without departing from the scope of the present invention.

Figure 3:
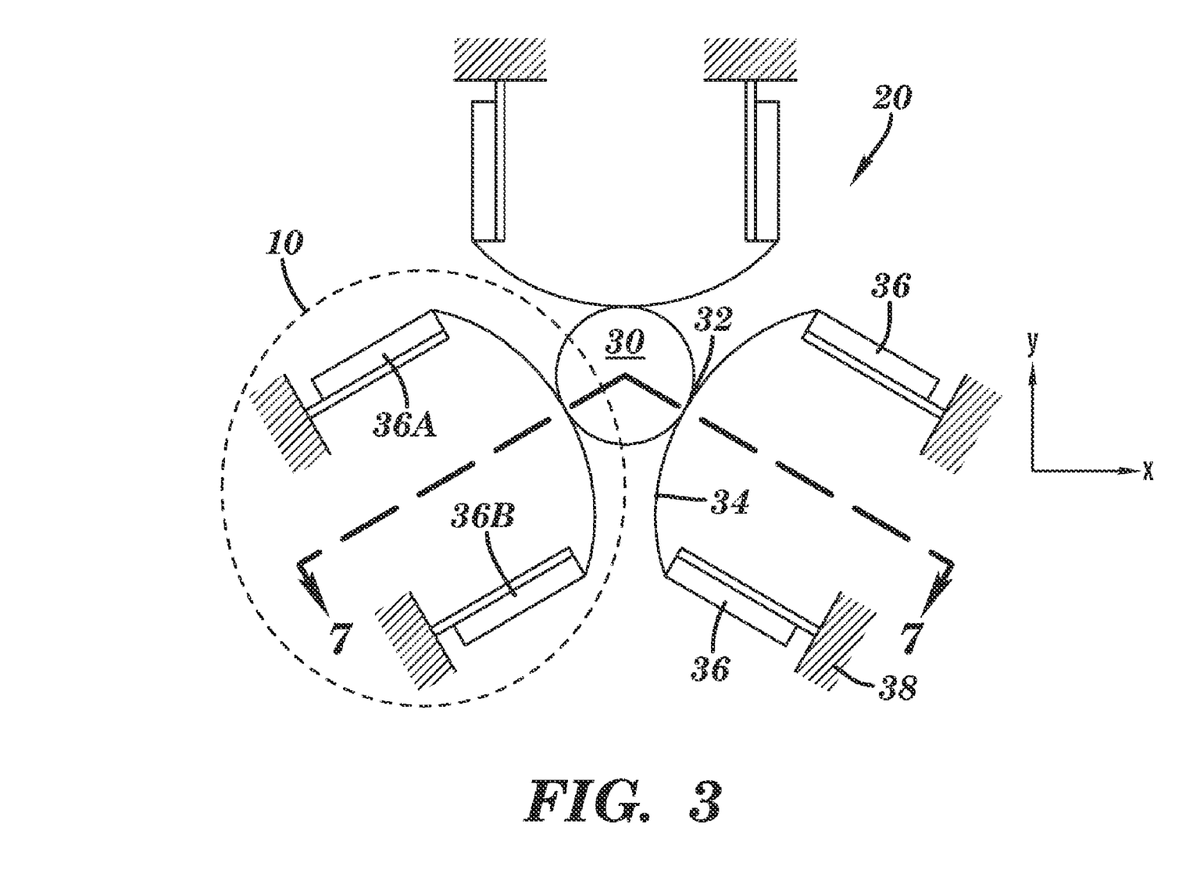
FIG. 3 is a schematic plan view of another alternate embodiment of a positioner of the present invention.

As mentioned above, this high frequency extraction may be accomplished using any number of various configurations, such as the opposed chevron pairs 110 or opposed actuator pairs 10 as shown in FIG. 3.

Figure 2B:
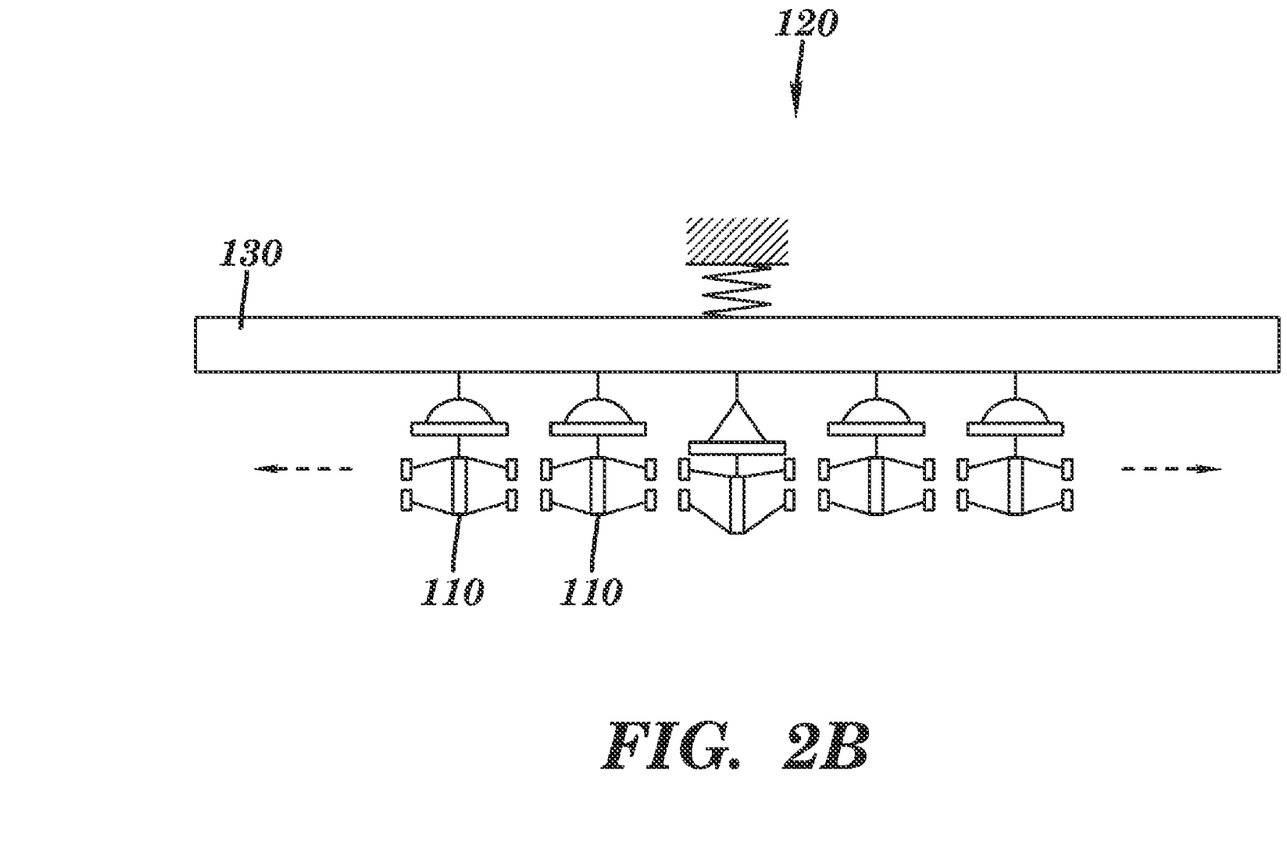
FIG. 2B is a schematic plan view of an alternate embodiment of a positioner of the present invention.

For example, turning now to FIG. 2B, more than two actuator pairs 110 may be used in parallel in either single or multiple layers. In this example, an array of five or more chevron pairs 110 may be coupled in parallel to a common stage 130 to produce positioner 120. Such a parallel configuration may be used to still further increase the bandwidth in a given direction. This increased bandwidth may be realized by using controller 12 (FIG. 2A) to actuate the various parallel actuator pairs 110 sequentially, in relatively close succession, e.g., to provide pulses in closer succession than may be possible using only the two actuator pairs 110 of positioner 220 (FIG. 2A). The parallel pairs 110 may be disposed within the same layer, or within multiple layers as discussed hereinbelow with respect to FIG. 7, to provide both in-plane and out-of-plane motion.

Figure 7:
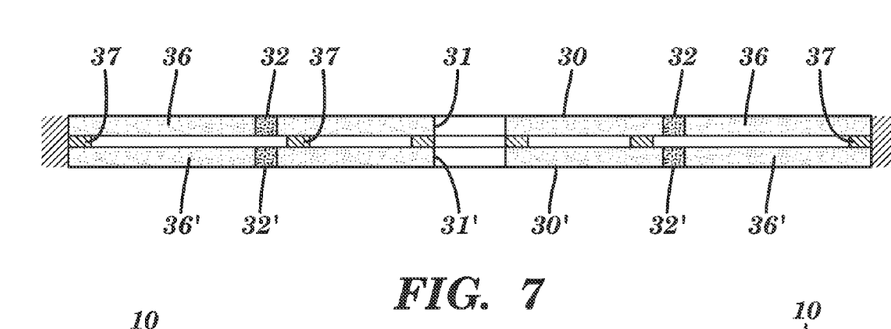
FIG. 7 is a schematic cross-sectional view, taken along 7-7 of FIG. 3.

Turning now to FIGS. 3 & 7, another alternate embodiment of the present invention is shown as positioner 20, which includes a series of actuator pairs 10 spaced about a stage 30, to form a planar, monolithic, micro-scale device which generates controlled displacements/motions via compliance of the device's structure, such as described in the aforementioned '866 application.

In this embodiment, device 20 includes stage 30 supported by beams (flexures) 34. Flexures 34 are coupled, e.g., at opposite ends thereof, to distal ends of actuators 36. Proximal ends of actuators 36 are secured to ground 38. As shown in FIG. 7, positioner 20 may be provided with multiple layers of actuator pairs 10, 10', in which each actuator pair 10 of one layer has a parallel actuator pair 10' superposed therewith in another layer. This configuration enables relatively high bandwidth in-plane motion, and/or out-of-plane motion as described hereinbelow.

As shown in FIG. 7, a spacer layer 37 may be used to physically join, while separating and thermally insulating, the first and second layers to effectively form a three-layer construction. (Although a three-layer device is used as an example here, five or more layers can be implemented in a multi-layer MFM to enhance a positioner's out-of-plane bandwidth.) Stage 30, 30' may be optionally provided with a central bore 31, 31' to facilitate some positioning applications. The multi-layer architecture, while tending to be counter-intuitive for the reasons discussed below, may advantageously provide device 20 with both in-plane motion (in substantially the same manner as provided by a single layer configuration) and out-of-plane motion as will be discussed hereinbelow.

Figure 4A:
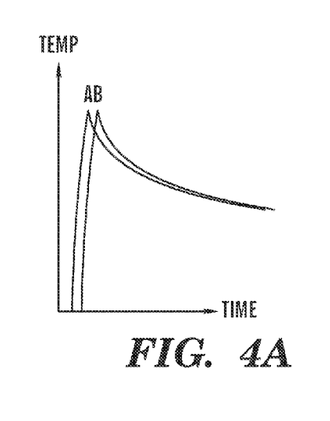
FIGS. 4A-4D are graphical representations of operational aspects of the actuation system of FIG. 3.
Figure 4B:
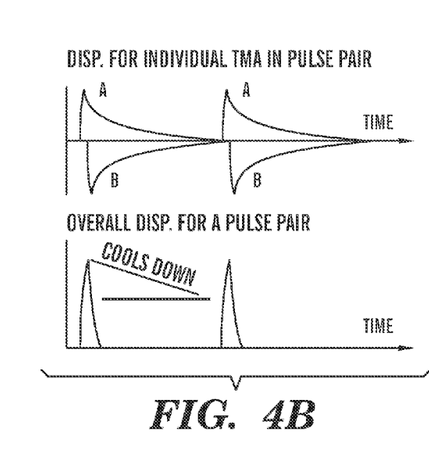
Figure 4C:
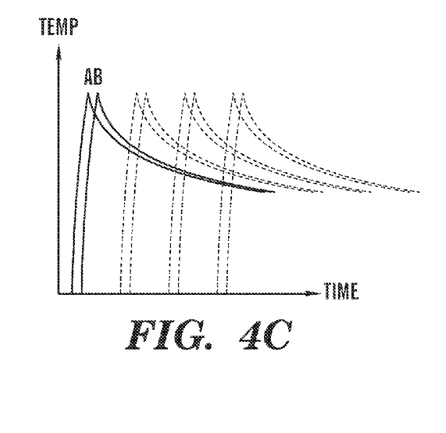
Figure 4D:
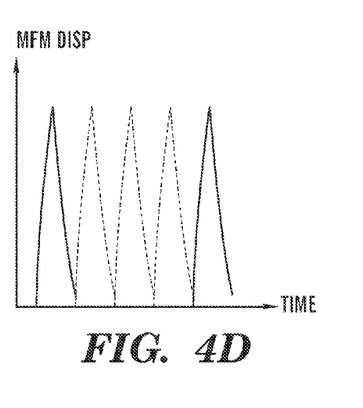

Turning now to FIG. 4A, operational aspects of the aforementioned embodiments are discussed. The sequential (time delayed) energization of the opposed actuators of each pair 10, 110 generates temperature profiles within each actuator 36A, 36B which are shown respectively at A and B. As shown, each of the actuators cools down relatively slowly after reaching their peak temperatures, however the resultant motion for the actuator pair is relatively sharp pulse motion in both directions as shown by the displacement curves of FIG. 4B. It should thus be evident that the mechanical pulse width of the pair 10, 110 is not limited by the relatively slow cooling process illustrated by the trailing right hand side of the pulses in FIG. 4A. Rather, the actuator pair 10, 110 is capable of generating motion with a significantly shorter pulse width, i.e., shown as the distance between peaks in the A and B curves of FIGS. 4A and 4B, despite the long cooling pulse width. The pulse width may thus be limited only by the resonance frequency of the particular actuator pair and the positioner into which the pairs 10, 110 are incorporated. It should also be noted that the overall bandwidth of an individual actuator pair 10, 110 may be at least approximately twice that of a single actuator 36, such as also shown in FIG. 4B. As shown in phantom in FIGS. 4C and 4D, the actuator pairs may be actuated repeatedly, without waiting for complete cool-down of both actuators, to further enhance high bandwidth operation thereof. (As discussed hereinabove, the use of two or more actuator pairs 10, 110 may enable further increases in stage moving bandwidth by use of secondary (and tertiary, etc.) actuators while the first-energized actuator pair cools.)

Figure 5:
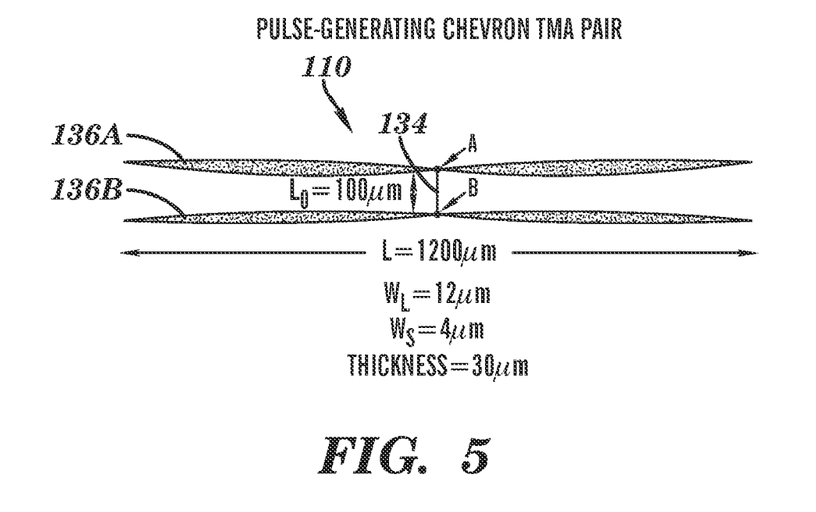
FIG. 5 is a schematic plan view of an alternate embodiment of an actuation system of the present invention.
Figure 6A:
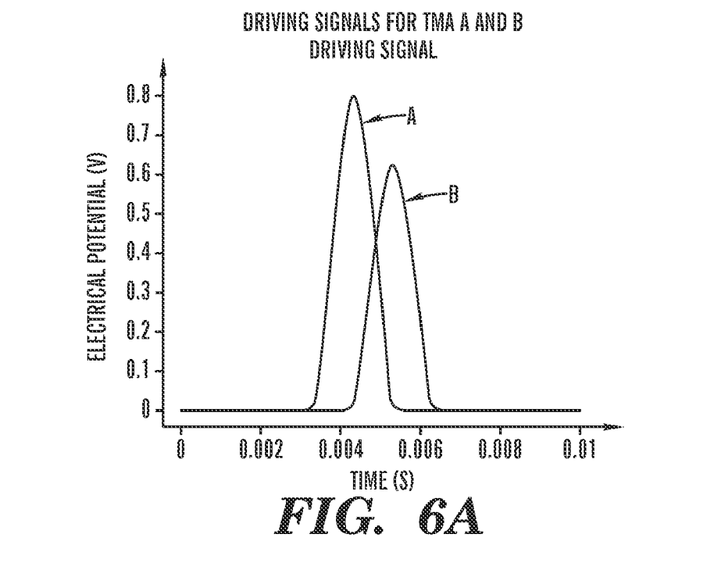
FIGS. 6A-6C are graphical representations of operational aspects of the actuation system of FIG. 6A.
Figure 6B:
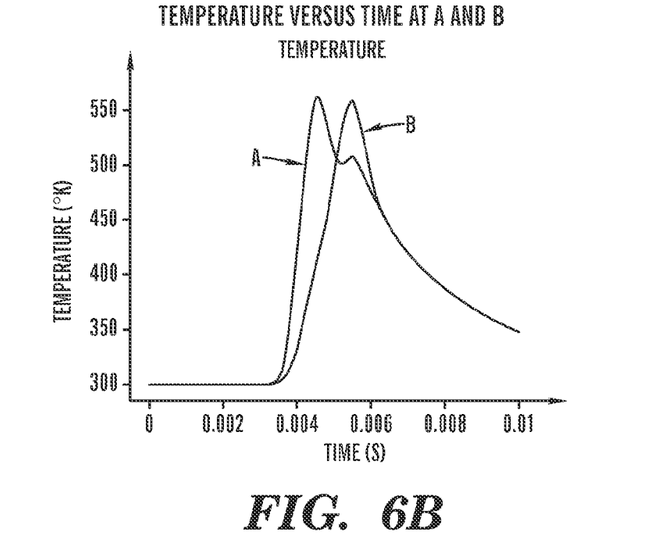
Figure 6C:
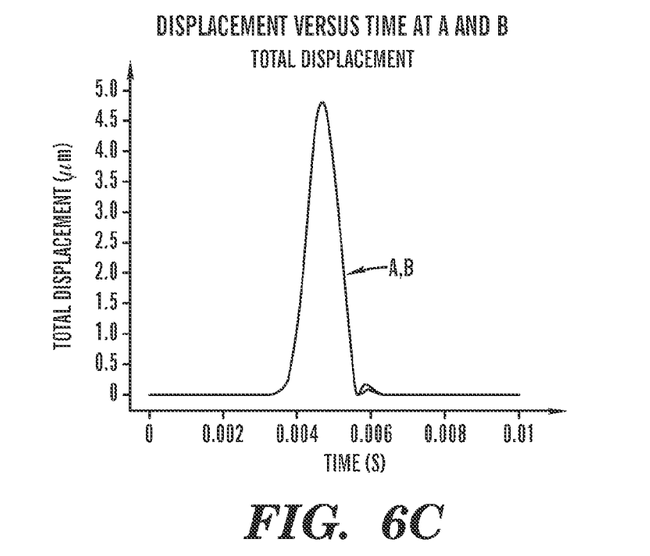

Referring now to FIGS. 5 and 6A-6C, operational parameters of an exemplary actuator pair 110 will be discussed. As shown in FIG. 5, actuator pair 110 includes microfabricated actuators 136A and 136B, each having a length L of 1200 µm, widths (e.g., parallel to the page as shown) that taper along their lengths from a small width Ws of 4 µm to a large width $W_L$ of 12 µm, a thickness (e.g., into the page as shown) of 30 µm, and a center spacing $L_D$ therebetween of 100 µm as provided by flexure 134. It should be recognized that the aforementioned dimensions are merely representative, and that one or more of these dimensions may be modified as required for particular applications. Representative operational parameters, including driving signals, temperature versus time, and displacement versus time for each actuator 136A, 136B, are respectively shown at A and B of FIGS. 6A-6C.

Figure 8A:
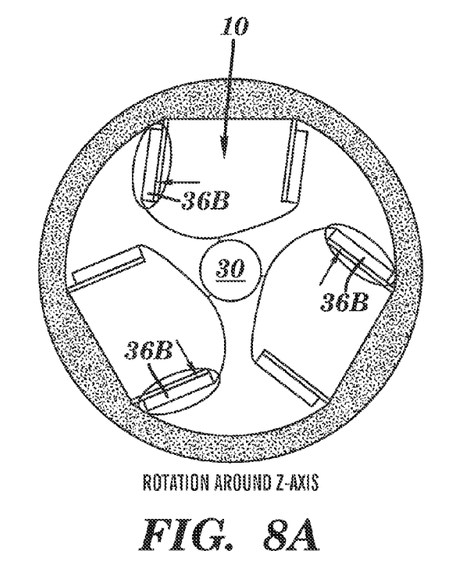
FIG. 8A is a view similar to that of FIG. 3, with the positioner actuated to generate rotational movement about the z-axis.
Figure 8B:
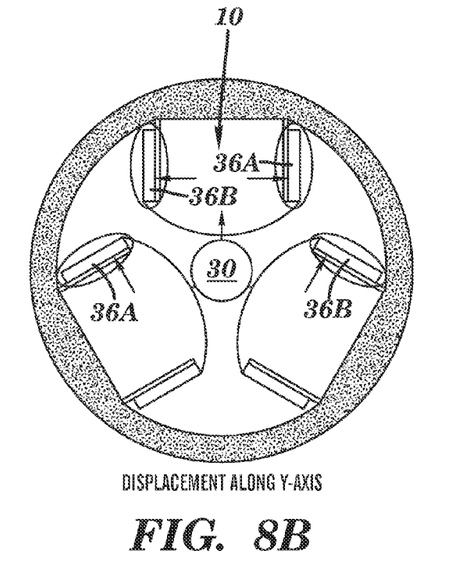
FIG. 8B is a view similar to that of FIG. 8A, with the positioner actuated to generate translational movement along the y-axis.

Turning now to FIGS. 8A & 8B, in-plane motion of multiple layer device 20 may be effected by simultaneous energization of various co-planar actuators 36 as shown. Actuators 36' (FIG. 7) superposed therewith may be subsequently actuated in a similar manner, e.g., while actuators 36 cool, to provide relatively increased operational bandwidth. Alternatively, particular actuators 36 and their superposed actuators 36' may be actuated simultaneously to preclude any undesired out-of-plane motion. Examples of multiple layered devices 20 may enable the relative position between stage 30 and ground 38 to be adjustable with a translational resolution in increments as small as one Angstrom. In these exemplary embodiments, the relative position between said stage 30 and ground 38 may also be adjustable with a rotational resolution in increments of less than about 5 micro radians.

Exemplary movement is shown in FIG. 8A, in which the device is shown after simultaneous energization of the "B" set of actuators, i.e., actuators 36B of each actuator pair 10, and prior to subsequent energization of the "A" set of actuators. This energization generates in-plane rotation of stage 30, i.e., rotation about a z-axis extending out of the page.

As also described above, embodiments of the present invention have been shown and described as including pairs of actuators 36A, 36B (or 136A, 136B) which are energized alternatively relative to one another. It should be recognized, however, that individual actuators may be alternately energized in nominally any order or sequence without departing from the scope of the present invention. For example, as shown in FIG. 8B, all but two of the six co-planar actuators, including both actuators 36A and 36B of one particular actuator pair 10, have been simultaneously energized, (along with any actuators 36', FIG. 7, superposed therewith) to displace stage 30 along the y-axis. This energization may then be followed by energization of the two remaining actuators (along with any superposed actuators 36', FIG. 7) to generate movement in the opposite direction. As with the example of FIG. 8A, in this example, any actuators 36' (FIG. 7) superposed with the energized actuators 36, may be energized in a similar manner, sequentially after energization of actuators 36, for relatively enhanced operational bandwidth. The superposed actuators may also be energized simultaneously to preclude any undesired out-of-plane motion.

Figure 8C:
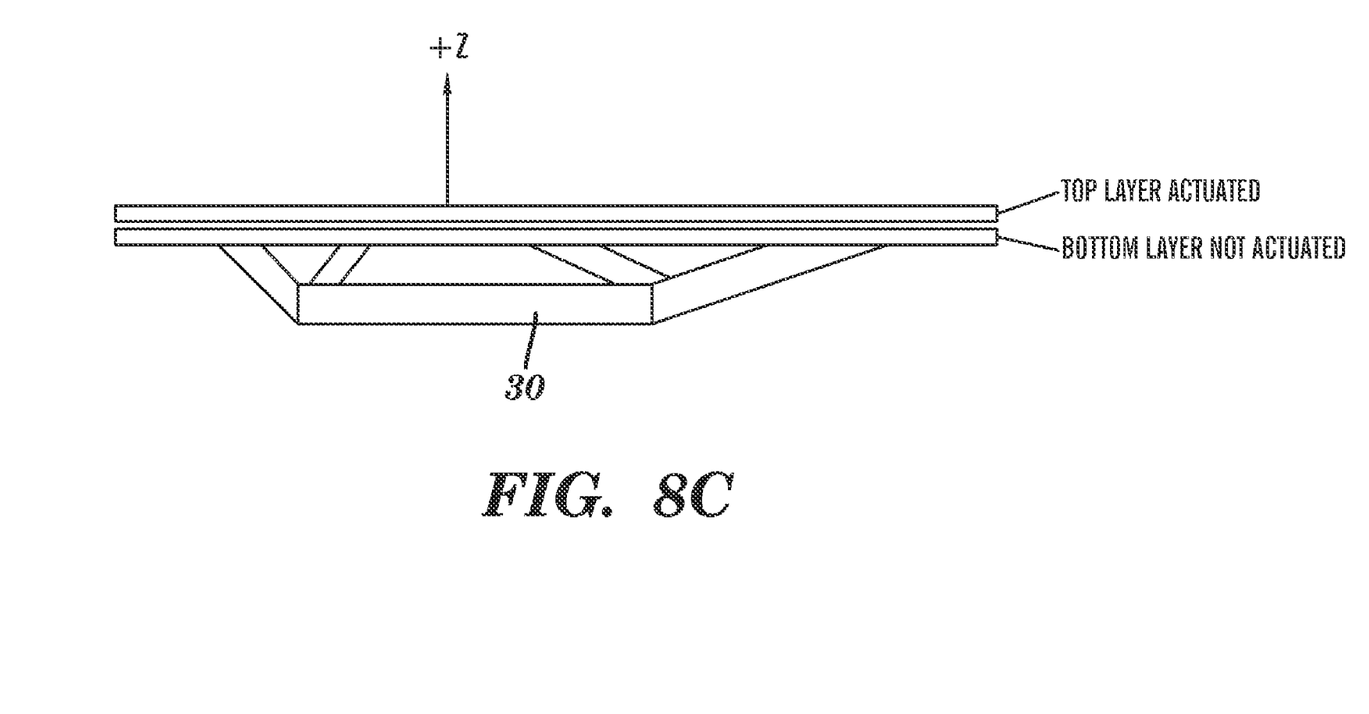
FIG. 8C is an elevational schematic view of the embodiment of FIGS. 8A & 8B, actuated to generate translational movement along the z-axis.

Moreover, a multi-layered embodiment such as shown in FIG. 7, may be used to generate out-of-plane motion and/or combinations of in-plane and out-of-plane motion by energizing superposed actuators 36, 36' independently of one another, and/or with different power levels. Referring now to FIG. 8C, the multi-layered embodiment of FIG. 7 is shown after actuators 36 have been energized, and prior to activating the actuators 36' superposed therewith, to move stage 30, 30' in the −z direction.

Those skilled in the art will recognize that nominally any combination of actuators may be alternately energized to generate movement of stage 30, 30' in various degrees of freedom. In the multi-layered embodiments, actuators 36, 36' may be alternately energized to generate movement of stage 30, 30' in any one or more of six degrees of freedom, i.e., x, y, z, θx, θy, θz, alone or in combination.

The multi-layered construction enables both in-plane and out-of-plane motion solely by use of in-plane actuators. Such use, in turn, enables these embodiments to be fabricated using microfabrication techniques, such as on a semiconductor wafer, for MEMS and other micro-scale applications, using many conventional semiconductor/integrated circuit (IC) fabrication techniques. Conventional wisdom has generally held that the bond formed between layers fabricated using these techniques, including chemical vapor deposition, microlithography, and etching (e.g., deep reactive ion etching (DRIE)) would likely fail due to shear when subjected to the out-of-plane loading described herein. Surprisingly, however, finite element simulations and tests of the multi-layered silicon-based embodiments in accordance with the present invention have demonstrated out-of-plane movement of stage 30, 30' without buckling or delamination.

Having described various embodiments of the present invention, the following is a description of an exemplary method of fabrication thereof. This method is shown and described with respect to the multi-layered embodiment of FIG. 7, with the understanding that it may be similarly applied to any of the other embodiments shown and described herein.

Figure 9A:
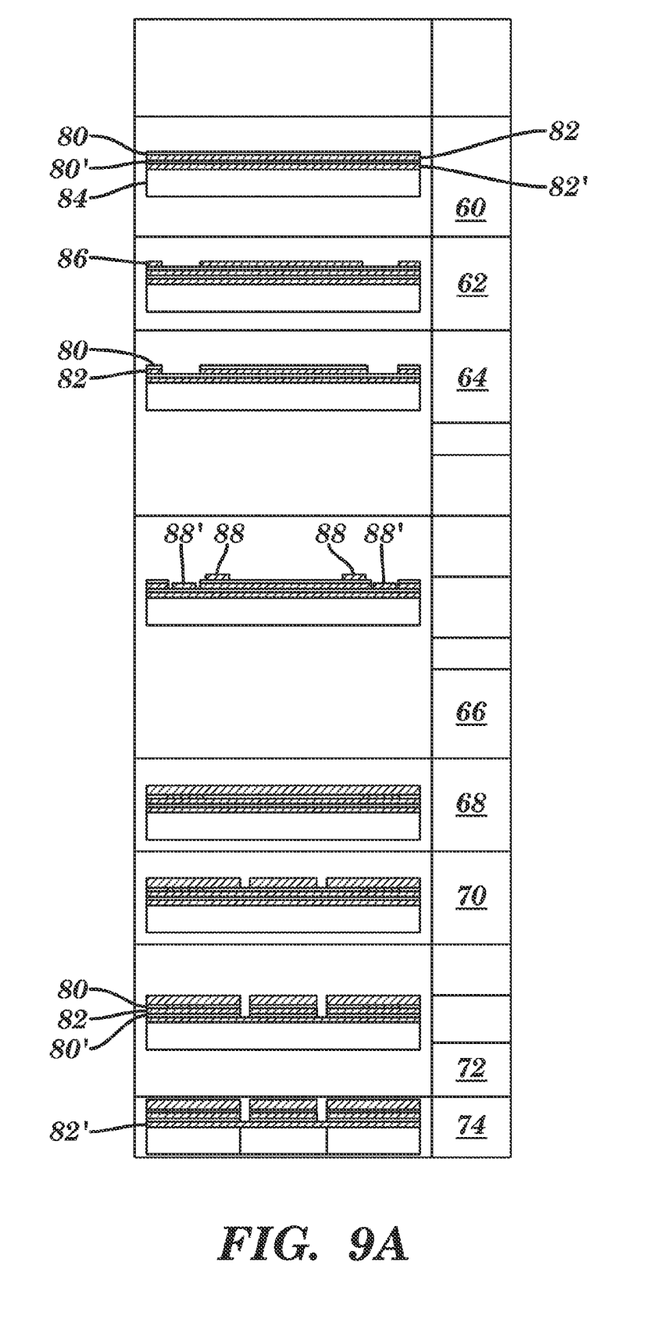
FIGS. 9A and 9B are tables of cross-sectional elevational views similar to that of FIG. 7, of various steps in the fabrication of the embodiment of FIGS. 3 and 8A-8C.
Figure 9B:
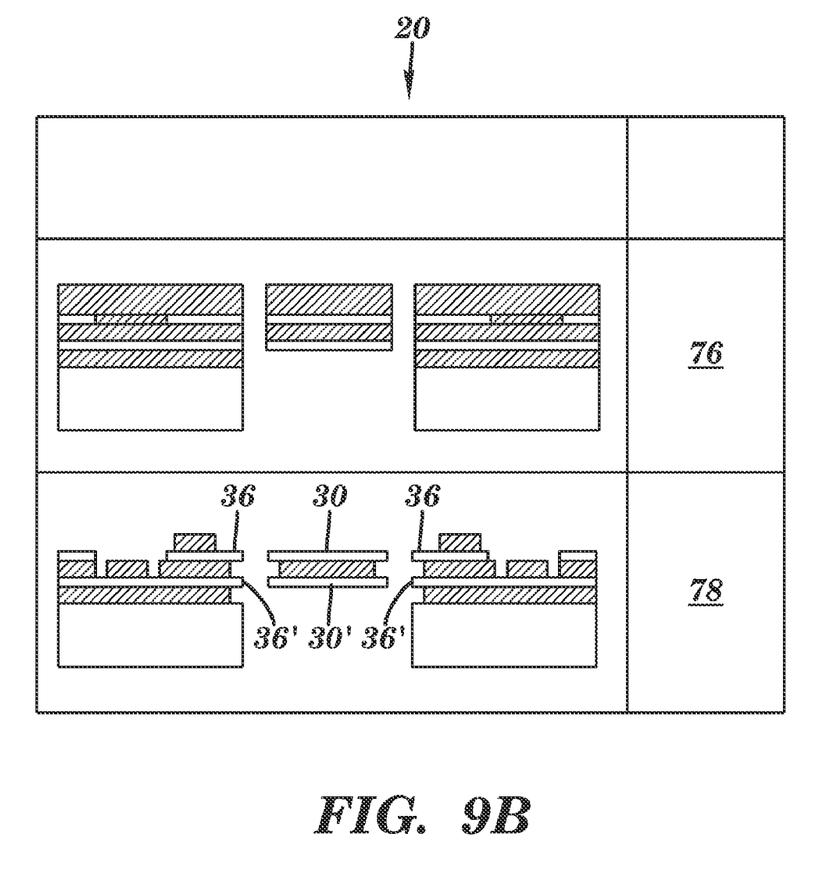

Turning now to FIGS. 9A and 9B, at 60, a double SOI (silicon on insulator) wafer is provided, having two device layers 80, 80' (e.g., 8 μm thick), and two oxide layers 82, 82' (e.g., 1 μm thick) on an insulator 84. Although a double silicon wafer is used in this example, embodiments of this invention may be fabricated from nominally any material known to those skilled in the art, including semiconductors such as doped silicon and/or aluminum nitride (AlN), or nominally any other material which may be developed or identified in the future. Particular embodiments of the present invention may use any number of micro-scale structural materials, such as those commonly used in MEMS manufacture, including for example, silicon, silicon dioxide, gallium arsenide, photoresist, SU8, metals and combinations thereof. In this regard, it is anticipated that non-conductive materials, e.g., having conductive components embedded therein, may be used to fabricate various embodiments hereof.

At 62, a photoresist 86 is applied and patterned to form a mask layer. At 64, a shallow etchant is applied to remove the exposed portions of device layer 80. A second etchant is then applied to remove the newly exposed portions of oxide layer 82. Photoresist layer 86 is then removed, e.g., through the use of asher (oxygen plasma).

At 66, electrical contacts 88, 88' for the actuators (36, 36' FIG. 7) are provided by applying (e.g., by sputtering, evaporating, or other means of depositing or growing) a metallization layer onto the wafer, i.e., onto exposed portions of layers 80 and 82. A photoresist is applied and patterned to portions of the metallization layer, to mask the desired contact area. An aluminum etchant is then used to remove unwanted aluminum. The photoresist is then removed, e.g., with oxygen plasma.

At 68, a relatively thick photoresist is applied to exposed surfaces of the wafer, and prebaked. The photoresist is patterned 70 into the desired topography of device 20 (e.g., FIG. 3).

At 72, a shallow etchant is applied to remove the exposed portions of device layer 80. A second (e.g., vaporized) etchant is then applied to remove the newly exposed portions of oxide layer 82. A shallow etchant is again applied to remove the exposed portions of second device layer 80'.

At 74, the underside of the wafer is patterned with a photoresist and etched to the oxide layer 82'. At 76, a vaporized etchant (e.g., HF vapor) is used to remove exposed portions of oxide layer 82'. At 78, the photoresist is removed, e.g., by use of oxygen plasma, to produce completed device of FIG. 7.

It should be understood that any of the features described with respect to any one of the embodiments described herein may be used with any other of the embodiments described herein without departing from the spirit and scope of the present invention.

In addition, the skilled artisan should also recognize that various embodiments of the present invention may include substantially any type of MEMS actuator system, including two or more mutually distinct types of actuators, and/or non-energizable actuators (e.g., compliant substrates on particular layers), without departing from the spirit and scope of the present invention.

In the preceding specification, the invention has been described with reference to specific exemplary embodiments thereof. It will be evident that various modifications and changes may be made thereunto without departing from the broader spirit and scope of the invention as set forth in the claims that follow. The specification and drawings are accordingly to be regarded in an illustrative rather than restrictive sense.

Having thus described the invention, what is claimed is:

1. A high-bandwidth micro electro-mechanical system (MEMS) actuation system comprising:
   a stage;
   at least two actuator pairs coupled in parallel to said stage;
   said actuator pairs each including at least first and second controlled input bi-directional semiconductor actuators;
   said actuators each being energizable to move in a drive direction against a bias from a rest position to an energized position, and each being movable by the bias to the rest position upon deenergization, wherein movement from the rest position to the energized position and back to the rest position defines an actuation cycle;
   said actuators being asymmetric, wherein a maximum energization frequency of movement from the rest to the energized positions is greater than a maximum bias frequency of movement from the energized to the rest positions;
   said first and second actuators being opposably coupled to one another, wherein drive directions of said actuators oppose one another;

a pulse generator coupled to said actuators of each actuator pair;

said pulse generator configured to alternately transmit energization pulses to said actuators of each actuator pair at an alternation frequency greater than said bias frequency of movement;

said pulse generator configured to transmit said energization pulses to each of said actuator pairs sequentially at a sequence frequency greater than a frequency of said actuation cycle;

wherein said actuators are each movable from their energized positions to their rest positions at a frequency greater than said bias frequency of movement, said actuator pairs are sequentially energizable at a sequence frequency greater than said cycle frequency, and said stage is movable in a single degree of freedom at a bandwidth of at least four times said cycle frequency.

2. The actuation system of claim 1, wherein said stage is movable in a single degree of freedom at a bandwidth of at least ten times said cycle frequency.

3. The actuation system of claim 1, wherein said stage is moveable in a plurality of degrees of freedom.

4. The actuation system of claim 1, wherein said actuators comprise microfabricated actuators.

5. The actuation system of claim 4, being fabricated from a micro-scale structural material selected from the group consisting of silicon, silicon dioxide, gallium arsenide, aluminum nitride, photoresist, SU8, metals and combinations thereof.

6. The actuation system of claim 4, wherein said actuators are coupled to one another by at least one beam.

7. The actuation system of claim 6, wherein said beam is coupled to a stage with at least one flexure hinge, wherein energization of said actuators is configured to generate controlled movement of said stage.

8. The actuation system of claim 7, wherein said actuators, said beam, said stage, and said flexure hinge are disposed within a semiconductor layer.

9. The actuation system of claim 8, wherein said actuators are coupled to a plurality of said beams at spaced locations thereon.

10. The actuation system of claim 7, wherein said first and second actuators extend in a planar direction within a first planar layer, and the actuation system further comprises at least a third controlled input bi-directional actuator extending within a second planar layer; said first layer being superposed with said second layer, and said third actuator being coupled to said beam; wherein selective, alternating energization of said actuators is configured to generate controlled movement of said stage in and out of the planar direction.

11. The actuation system of claim 10, wherein said first and second controlled input actuators are superposed with said third controlled input actuators.

12. The actuation system of claim 10, wherein said first layer and said second layer are coupled to one another by an intermediary layer.

13. The actuation system of claim 12, wherein said intermediary layer extends intermittently in the planar direction, so that said first and second layers are coupled to one another at spaced locations thereon.

14. The actuation system of claim 10, wherein:

said first, second, and third actuators are selectively energizable to effect longitudinal expansion thereof;

relative actuation between individual ones of actuators spaced in said planar direction relative to one another is configured to generate controlled movement of said stage within the planar direction;

relative actuation between individual ones of actuators spaced orthogonally to said planar direction relative to one another is configured to generate controlled movement of said stage out of the planar direction; and the position of said stage is adjustable in each of six degrees of freedom.

15. The actuation system of claim 14, wherein said first, second, and third controlled input actuators comprise thermal actuators.

16. The actuation system of claim 14 wherein the relative position between said stage and ground is adjustable with a translational resolution in increments as small as one Angstrom.

17. The actuation system of claim 14 wherein the relative position between said stage and ground is adjustable with a rotational resolution in increments of less than about 5 micro radians.

18. The actuation system of claim 10, wherein said stage comprises an other stage disposed within said second planar layer.

19. The actuation system of claim 18, wherein said at least one beam comprises at least one other beam extending in the planar direction within said second layer.

20. The actuation system of claim 19, wherein said other beam comprises a plurality of other beams disposed within said second layer.

21. The actuation system of claim 20, comprising a plurality of second flexure hinges disposed within said second layer, coupled to said other stage and to said other beams.

22. The actuation system of claim 21, wherein a plurality of said third actuators are coupled to said other beams at spaced locations thereon.

23. A method for actuation of a first component relative to a second component, said method comprising:

providing the actuation system of claim 7;

fastening the first component to the stage; and with said pulse generator, alternately transmitting energization pulses to said actuators at an alternation frequency greater than the bias frequency of movement to effect a change in position of the first component relative to the second component.

24. A method for actuation, comprising:

(a) coupling at least two actuator pairs in parallel to a stage, the actuator pairs including at least first and second bi-directional micro- or nano-scale sized actuators, each energizable to move in a drive direction against a bias from a rest position to an energized position, and each being movable by the bias to the rest position upon deenergization, wherein movement from the rest position to the energized position and back to the rest position defines an actuation cycle, the actuators being asymmetric, wherein a maximum energization frequency of movement from the rest to the energized positions is greater than a maximum bias frequency of movement from the energized to the rest positions;

(b) opposably coupling the first and second actuators to one another, wherein drive directions of said actuators oppose one another;

(c) coupling a pulse generator to the actuators of each actuator pair;

(d) with the pulse generator, alternately transmitting energization pulses to the actuators of each actuator pair at an alternation frequency greater than the bias frequency of movement;

(e) with the pulse generator, transmitting said energization pulses to each of said actuator pairs sequentially at a sequence frequency greater than a frequency of the actuation cycle;

wherein the actuators are each movable from their energized positions to their rest positions at a frequency greater than the bias frequency of movement, said actuator pairs are sequentially energizable at a sequence frequency greater than the cycle frequency, and the stage is movable in a single degree of freedom at a bandwidth of at least four times the cycle frequency.

25. The method of claim 24, wherein said actuators are selected from the group consisting of electro-mechanical, magnetostrictive, thermomechanical, and active carbon nanotube actuators.

26. A high-bandwidth micro electro-mechanical system (MEMS) actuation system comprising:

stage means;

at least two actuator pairs coupled in parallel to said stage means;

said actuator pairs each including at least first and second controlled input bi-directional actuation means;

said actuation means each being energizable to move in a drive direction against a bias from a rest position to an energized position, and each being movable by the bias to the rest position upon deenergization, wherein movement from the rest position to the energized position and back to the rest position defines an actuation cycle;

said actuation means being asymmetric, wherein a maximum energization frequency of movement from the rest to the energized positions is greater than a maximum bias frequency of movement from the energized to the rest positions;

said first and second actuation means being opposably coupled to one another, wherein drive directions of said actuators oppose one another;

a pulse generation means coupled to said actuators of each actuator pair;

said pulse generation means configured to alternately transmit energization pulses to said actuation means of each actuator pair at an alternation frequency greater than said bias frequency of movement;

said pulse generation means configured to transmit said energization pulses to each of said actuator pairs sequentially at a sequence frequency greater than a frequency of said actuation cycle;

wherein said actuation means are each movable from their energized positions to their rest positions at a frequency greater than said bias frequency of movement, said actuator pairs are sequentially energizable at a sequence frequency greater than said cycle frequency, and said stage means is movable in a single degree of freedom at a bandwidth of at least four times said cycle frequency.

27. The system of claim 26, wherein said actuation means are selected from the group consisting of nano-scale and micro-scale sized actuators.

28. The system of claim 27, wherein said actuation means are selected from the group consisting of electro-mechanical actuators, magnetostrictive actuators, thermomechanical actuators, active carbon nanotube actuators, and combinations thereof.

29. The system of claim 1, wherein the actuators are non-piezoelectric.

* * * * *